United States Patent [19]
Breault et al.

[11] Patent Number: 6,048,383
[45] Date of Patent: Apr. 11, 2000

[54] MASS TRANSFER COMPOSITE MEMBRANE FOR A FUEL CELL POWER PLANT

[75] Inventors: Richard D. Breault, North Kingstown, R.I.; Thomas F. Fuller, Glastonbury; Leslie L. Van Dine, Manchester, both of Conn.

[73] Assignee: International Fuel Cells, L.L.C., South Windsor, Conn.

[21] Appl. No.: 09/168,511

[22] Filed: Oct. 8, 1998

[51] Int. Cl.$^7$ .................................................. B01D 53/22
[52] U.S. Cl. .............................. 95/44; 95/45; 95/52; 96/5; 96/7; 96/12
[58] Field of Search ................................... 95/43–45, 52; 96/7, 12, 13, 5

[56] References Cited

U.S. PATENT DOCUMENTS

| | | | |
|---|---|---|---|
| 3,416,985 | 12/1968 | Dounoulos | 96/7 X |
| 3,837,146 | 9/1974 | Faure et al. | 96/7 |
| 3,854,904 | 12/1974 | Jamet | 96/7 |
| 5,037,457 | 8/1991 | Goldsmith et al. | 96/12 |
| 5,082,472 | 1/1992 | Mallouk et al. | 96/12 X |
| 5,503,944 | 4/1996 | Meyer et al. | 429/13 |
| 5,573,866 | 11/1996 | Van Dine et al. | 429/13 |
| 5,620,500 | 4/1997 | Fukui et al. | 95/52 |
| 5,643,355 | 7/1997 | Philips et al. | 96/7 X |
| 5,665,146 | 9/1997 | Mizobe | 96/7 |
| 5,830,261 | 11/1998 | Hamasaki et al. | 96/13 X |

FOREIGN PATENT DOCUMENTS

| | | | |
|---|---|---|---|
| 1792676 | 9/1972 | Germany | 96/7 |
| 59-050188 | 3/1984 | Japan | 96/12 |
| 6-063341 | 3/1994 | Japan | 96/8 |

OTHER PUBLICATIONS

Printed Article Entitled "Feasibility Study of SPE Fuel Cell Power Plants for Automotive Applications", Written on November 17, 1981 by General Electric Corporation, Direct Energy Conversion Programs, 50 Fordham Rd., Wilmington, MA 01887, (See, Figs. 1, 16, 28, and pp. 58–60.).

*Primary Examiner*—Robert H. Spitzer
*Attorney, Agent, or Firm*—Malcolm J. Chisholm, Jr.

[57] ABSTRACT

A mass transfer composite membrane for use with a fuel cell power plant includes a transfer medium core between opposed, rigid, porous support sheets. An inlet surface of the composite membrane is positioned in contact with an oxidant inlet stream of a fuel cell power plant, and an opposed exhaust surface of the composite membrane is positioned in contact with an exhaust stream exiting the fuel cell power plant to recover mass such as water from the exhaust stream and transfer it into the oxidant inlet stream entering the fuel cell. The transfer medium core may comprise any of a variety of materials for sorbing a fluid substance consisting of polar molecules such as water molecules from a fluid stream consisting of polar and non-polar molecules. A preferred transfer medium core is an ionomeric membrane such as a water saturated polyfluorosulfonic acid ionomer membrane. The porous support sheets may comprise a reinforcing fiber with a thermoset resin, such as a carbon sheet with a phenolic resin, or a glass fiber with an epoxy resin, wherein the sheets are thermoset into a rigid configuration. The mass transfer composite membrane may be a flat or a mounded layer defining protrusions and depressions. A plurality of the mounded layer membranes may be disposed within a frame in mirror-image association wherein protrusions and depressions formed by the mounds of adjacent membranes contact each other to define serpentine passages for the inlet and exhaust streams.

16 Claims, 6 Drawing Sheets

MASS TRANSFER COMPOSITE MEMBRANE FOR A FUEL CELL POWER PLANT

TECHNICAL FIELD

The present invention relates to fuel cell power plants that operate at about ambient pressures and are suited for usage in transportation vehicles, as portable power plants, or as stationary power plants, and the invention especially relates to a fuel cell power plant that transfers mass, such as water vapor, exiting the plant back into the plant to enhance water balance and energy efficiency of the plant.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame that defines manifolds for directing flow of reducing, oxidizing, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane as the electrolyte, the hydrogen electrochemically reacts at a surface of an anode catalyst to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is a proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention. As is well-known however, PEM cells have significant limitations especially related to liquid water transport to, through and away from the PEM, and related to simultaneous transport of gaseous reducing and oxidant fluids to and from the electrodes adjacent opposed surfaces of the PEM. The prior art includes many efforts to minimize the effect of those limitations.

In operation of a fuel cell employing a PEM, the membrane is saturated with water, and the anode electrode adjacent the membrane must remain wet. As hydrogen ions produced at the anode electrode transfer through the electrolyte, they drag water molecules with them from the anode to the cathode. Water also transfers back to the anode from the cathode by osmosis. Product water formed at the cathode electrode is removed by evaporation or entrainment into a circulating gaseous stream of oxidant, or by capillary action into and through a porous fluid transport layer adjacent the cathode. Porous water transport plates supply liquid water from a supply of coolant water to the anode electrode and remove water from the cathode electrode returning it back to the coolant water supply, and the plates thereby also serve to remove heat from the electrolyte and electrodes.

In operation of PEM fuel cells, it is critical that a proper water balance be maintained between a rate at which water is produced at the cathode electrode and rates at which water is removed from the cathode and at which liquid water is supplied to the anode electrode. An operational limit on performance of a fuel cell is defined by an ability of the cell to maintain the water balance as electrical current drawn from the cell into the external load circuit varies and as an operating environment of the cell varies. For PEM fuel cells, if insufficient water is returned to the anode electrode, adjacent portions of the PEM electrolyte dry out thereby decreasing the rate at which hydrogen ions may be transferred through the PEM and also resulting in cross-over of the reducing fluid leading to local over heating. Similarly, if insufficient water is removed from the cathode, the cathode electrode may become flooded effectively limiting oxidant supply to the cathode and hence decreasing current flow. Additionally, if too much water is removed from the cathode by the gaseous stream of oxidant, the cathode may dry out limiting ability of hydrogen ions to pass through the PEM, thus decreasing cell performance.

As fuel cells have been integrated into power plants developed to power transportation vehicles such as automobiles, trucks, buses, etc., maintaining an efficient water balance within the power plant has become a greater challenge because of a variety of factors. For example, with a stationary fuel cell power plant, water lost from the plant may be replaced by water supplied to the plant from off-plant sources. With a transportation vehicle, however, to minimize weight and space requirements of a fuel cell power plant the plant must be self-sufficient in water to be viable. Self-sufficiency in water means that enough water must be retained within the plant to offset losses from a stream of reactant fluid to efficiently operate the plant. For example, any water exiting the plant through a plant exhaust stream consisting of a cathode exhaust stream of gaseous oxidant and/or an anode exhaust stream of gaseous reducing fluid must be balanced by water produced electrochemically at the cathode and retained within the plant.

One approach to enhancing water balance for fuel cell power plants in transportation vehicles is to pressurize the cell and related components to increase reactant concentrations in high pressure gaseous streams and thereby reduce water loss through plant exhaust streams. Such pressurized fuel cell power plants, however, require additional cost, weight and control apparatus in providing appropriate pressure housings and controls, and pressurized plants require additional energy derived from the plant to operate pressurizing pumps, valves, fans, etc., and are not known to be practical for portable power plants.

Another common approach to enhancing water balance is use of condensing heat exchangers downstream of power plant exhaust streams wherein the exhaust streams are cooled to a temperature at or below their dew points to precipitate liquid out of the exhaust streams so that the liquid may be returned to the power plant. An example of a PEM fuel cell power plant using a condensing heat exchanger is shown in U.S. Pat. No. 5,573,866 that issued on Nov. 12, 1996 to Van Dine et al., and is assigned to the assignee of the present invention, and which patent is hereby incorporated herein by reference. Many other fuel cell power plants that use one or more condensing heat exchangers are well-known in the art, and they typically use ambient air streams as a cooling fluid passing through the exchanger to cool the plant exhaust streams. In Van Dine et al., the heat exchanger is used to cool an exhaust stream exiting a cathode chamber housing the cathode electrode. Prior to entering the cathode housing, the same stream provides air as the oxidant for the cathode electrode, and upon leaving the chamber the stream includes evaporated product water and some portion of methanol, the reducing fluid, that has passed through the PEM. The condensing heat exchanger passes the cathode exhaust stream in heat exchange relationship with a stream of cooling ambient air, and then directs condensed methanol and water indirectly through a piping system back to an anode side of the cell.

While condensing heat exchangers have enhanced water balance and energy efficiency of ambient and pressurized fuel cell power plants, the heat exchangers encounter decreasing water recovery efficiency as ambient temperatures increase. Where the power plant is to power a transportation vehicle such as an automobile, the plant will be exposed to an extremely wide range of ambient temperatures. For example where an ambient air coolant stream passes through a heat exchanger, performance of the exchanger will vary as a direct function of the temperature of the ambient air because decreasing amounts of liquid precipitate out of power plant exhaust streams as the ambient air temperature increases.

An additional complication of known fuel cell power plants designed for use in transportation vehicles is also related to fluctuations in ambient air conditions. Fuel cells of such plants typically utilize ambient air as the oxidant directed to the cathode electrode. Hot and dry ambient air increases a risk that the cathode electrode will dry out. Consequently, many efforts have been undertaken to prevent drying out of the cathode electrode and adjacent electrolyte especially in PEM fuel cells, including: directing liquid condensate from condensing heat exchangers to humidify gaseous reactant and oxidant streams entering the cell; adding porous support layers and water transport plates in fluid communication with the electrodes for movement of coolant water through adjacent cells; and, generating a pressure differential on the anode side of the cell wherein gaseous reducing fluids are maintained at a slightly higher pressure than coolant water and anode supply water passing through the porous support layers adjacent reducing gas distribution channels so that the pressure differential assists water transport through the porous support layers and cell. Such efforts at maintaining efficient water balance involve additional cost, weight and volume, and often require complicated control apparatus.

Accordingly, known pressurized plants and plants that employ ambient air as the cathode oxidant or that use ambient air for condensing heat exchangers are incapable of maximizing an efficient water balance and minimizing operating energy requirements because of their above described characteristics. It is therefore highly desirable to produce a fuel cell power plant that achieves an efficient water balance for the entire plant and minimizes plant operating energy requirements.

DISCLOSURE OF THE INVENTION

A mass transfer composite membrane is disclosed for use with a fuel cell power plant. The mass transfer composite membrane includes a transfer medium core between opposed, rigid, porous support sheets, wherein an inlet surface of the composite membrane is positioned in contact with an oxidant inlet stream of a fuel cell power plant, and an opposed exhaust surface of the composite membrane is positioned in contact with an exhaust stream exiting the fuel cell power plant. The transfer medium core may comprise any of a variety of materials for sorbing a fluid substance consisting of polar molecules such as water molecules from a fluid stream consisting of polar and non-polar molecules. A preferred transfer medium core is an ionomeric membrane such as a water saturated polyfluorosulfonic acid ionomer membrane. The porous support sheets may comprise a reinforcing fiber with a thermoset resin, such as a carbon sheet with a phenolic resin, or a glass fiber with an epoxy resin, wherein the sheets are thermoset into a rigid configuration.

The mass transfer composite membrane may be disposed within a frame of a mass transfer device in fluid communication with the fuel cell power plant inlet and exhaust streams so that the frame restricts bulk mixing of the inlet and exhaust streams. The frame may define manifolds, passageways, and seals to direct the inlet and exhaust streams into contact with the composite membrane, and out of the frame. Alternatively, the manifolds may be external to the frame. The mass transfer composite membrane may be a flat or a mounded layer defining protrusions and depressions. A plurality of the mounded layer membranes may be disposed within the frame in mirror-image association wherein protrusions and depressions formed by the mounds of adjacent membranes contact each other. In such a mirror-image association, the mounded mass transfer composite membranes cooperate for mutual structural support; for enhancing mixing of fluids passing through passageways defined between adjacent mounds; and, for increasing surface area exposure of the membranes to the fluids per unit volume of the frame.

In operation of a fuel cell power plant employing a mass transfer composite membrane of the present invention, the oxidant inlet stream prior to passing into the fuel cell is directed through the frame into contact with the inlet surface of the composite membrane while the exhaust stream is directed through the frame into contact with the exhaust surface of the membrane. Water molecules and any other polar molecules (such as methanol) in the exhaust stream will transfer selectively through the transfer medium core into the inlet stream to help humidify and heat the inlet stream, thereby aiding in preserving a water balance within the fuel cell by restricting water loss from the cell.

Accordingly, it is a general object of the present invention to provide a mass transfer composite membrane for use with a fuel cell power plant that overcomes deficiencies of prior art fuel cell power plants.

It is a more specific object to provide a mass transfer composite membrane for use within a mass transfer device of a fuel cell power plant that transfers heat, water and fuel from a plant exhaust stream into a plant inlet stream independent of ambient air conditions.

It is yet another object to provide a mass transfer composite membrane that enhances a water balance and decreases volume and weight of a fuel cell power plant.

It still a further object to provide a mass transfer composite membrane for use within a mass transfer device of a fuel cell power plant that tolerates substantial pressure fluctuations within the device.

These and other objects and advantages of this invention will become more readily apparent when the following description is read in conjunction with the accompanying drawings.

DESCRIPTION OF THE PREFERRED EMBODIMENTS

Figure 1:
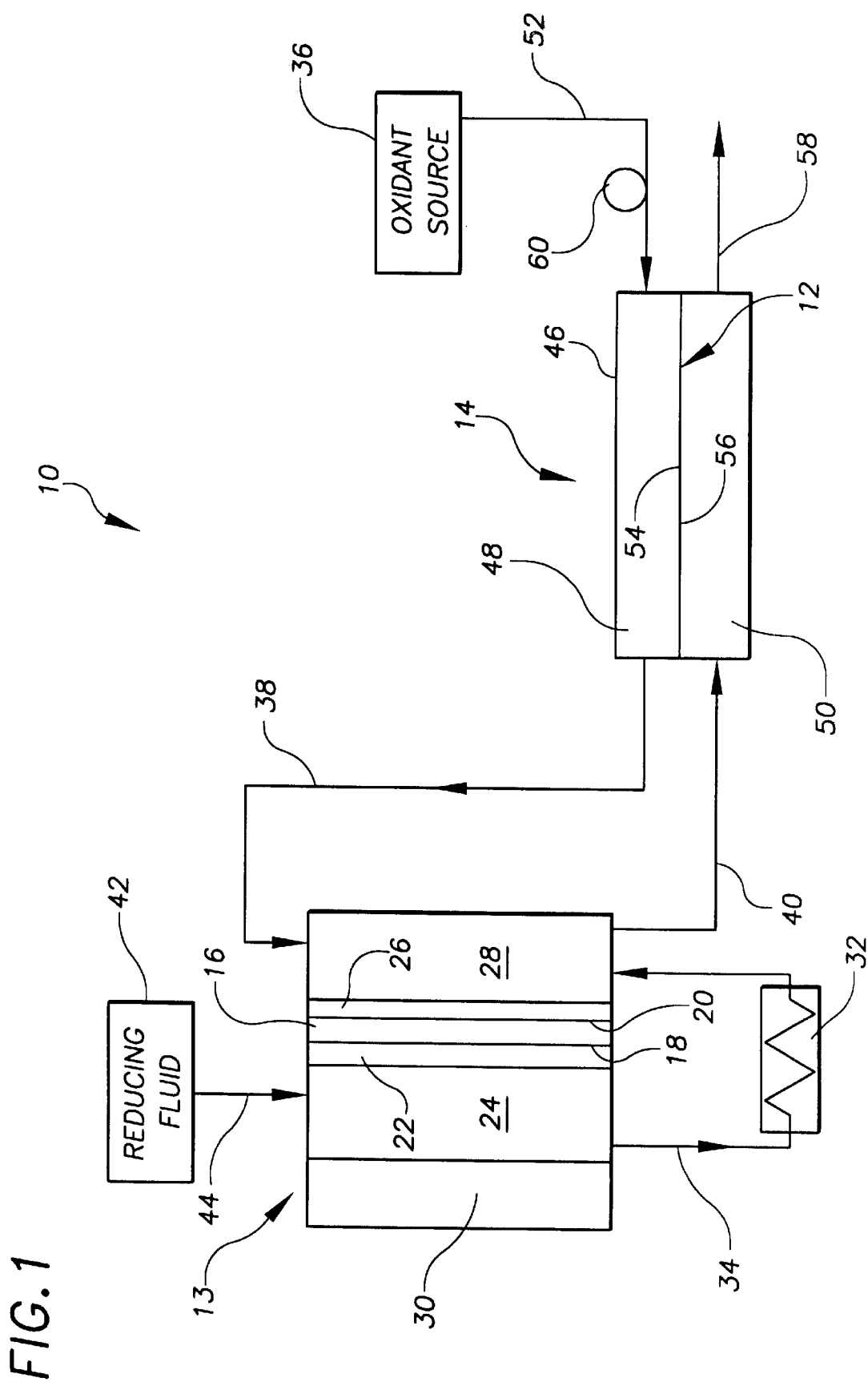
FIG. 1 is a schematic representation of a mass transfer composite membrane of the present invention within a mass transfer device of a fuel cell power plant.

Referring to the drawings in detail, a fuel cell power plant is shown schematically in FIG. 1 and generally designated by the reference numeral 10 as an appropriate working environment for a mass transfer composite membrane 12 of the present invention. The power plant 10 includes at least one fuel cell 13 and a mass transfer device 14 that supports the membrane 12. The fuel cell 13 includes an electrolyte 16 such as a proton exchange membrane ("PEM") or an acid or base electrolyte having a first major surface 18 and an opposed second major surface 20; an anode electrode 22 supported by a porous anode support layer 24 in intimate contact with the first major surface 18 of the electrolyte 16; and, a cathode electrode 26 supported by a porous cathode support layer 28 in intimate contact with the second major surface 20 of the electrolyte 16. The anode and cathode porous support layers 24, 28 may be formed of porous or channeled graphite, carbon or metal sheets. The fuel cell 13 may be combined with other virtually identical fuel cells (not shown) in a well-known manner to form a stack. As is common in the art, the fuel cell 13 may be enclosed within a structure 30 that defines manifolds for directing streams of reducing fluids and oxidants into and out of the cell, and the structure 30 also includes electrical conduction means for directing an electrical current generated by the fuel cell out of the cell 13 to an electricity using device 32, such as through a standard external load circuit 34.

An oxidant or inlet stream such as air is directed from an oxidant source 36 into the fuel cell 13 through a primary oxidant passage 38 that passes a stream of oxidant into the porous cathode support layer 28 so that the oxidant passes in contact with the cathode electrode 26 to provide oxidant to the electrode 26 for facilitating an electrochemical reaction at the cathode electrode and for sweeping into the oxidant stream by evaporation and/or entrainment water formed at the cathode electrode 26 as well as water carried through the electrolyte 16 from the anode electrode 22 or any humidification water in the oxidant stream. The oxidant stream then passes out of the cathode support layer 28 as a plant exhaust stream within a plant exhaust passage 40. The plant exhaust passage may also direct an anode exhaust stream after such a stream passes through an auxiliary burner (not shown.) Therefore, the plant exhaust stream may include a cathode exhaust stream having passed out of the cathode support layer, or the anode exhaust stream having passed through the auxiliary burner, or a combination of both the cathode and anode exhaust streams. A reducing fluid stream is directed from a reducing fluid supply source 42 through a reducing fluid inlet 44 into the porous anode support layer 24 so that the reducing fluid such as hydrogen comes into contact with the anode electrode 22. In a well-known manner, the reducing fluid electrochemically reacts at the anode electrode 22 to produce protons and electrons, wherein the electrons flow through the external load circuit 34 to power the electrical device 32 such as electric motors powering a transport vehicle, while the protons travel through the electrolyte 16 to the cathode electrode 26. The electrons then continue through the circuit 34 to the cathode electrode where they react with the oxidant and protons to form water and heat.

The mass transfer device 14 is secured in fluid communication with both the primary oxidant passage 38 and the plant exhaust passage 40. The mass transfer device 14 includes a frame means 46 for supporting the mass transfer composite membrane 12 in mass transfer relationship with the oxidant inlet stream and the plant exhaust stream and for preventing bulk mixing of the inlet and exhaust streams. The frame means may support the membrane 12 between an inlet passage 48 of the frame and an exhaust passage 50 of the frame. The inlet passage 48 directs the oxidant or inlet stream from an inlet stream feed line 52 across an inlet surface 54 of the mass transfer composite membrane 12 and out of the frame 46 into the primary oxidant passage 38. The exhaust passage 50 of the frame 46 directs the plant exhaust stream from the plant exhaust passage 40 across an exhaust surface 56 of the membrane 12 and out of the frame 46 through a plant discharge vent 58 out of the plant 10. The inlet and exhaust passages 48, 50 of the frame 46 thereby cooperate with the mass transfer composite membrane 12 to restrict bulk mixing of the oxidant inlet stream and plant exhaust stream and to position the membrane 12 in mass transfer relationship with the inlet and exhaust streams. The fuel cell power plant 10 may also include a blower 60 positioned on the inlet stream feed line 52 to variably accelerate flow of gaseous oxidant into the plant 10. Optionally, the blower 60 may be positioned along the primary oxidant passage 38 for the same purposes. It is stressed, however, that such a blower is of a capacity to only slightly increase operating pressures of the oxidant to a range of from atmospheric pressure to about 1.0 P.S.I. above atmospheric pressure, or from about 14.7 P.S.I.A. to about 15.7 P.S.I.A.

Figure 2A:
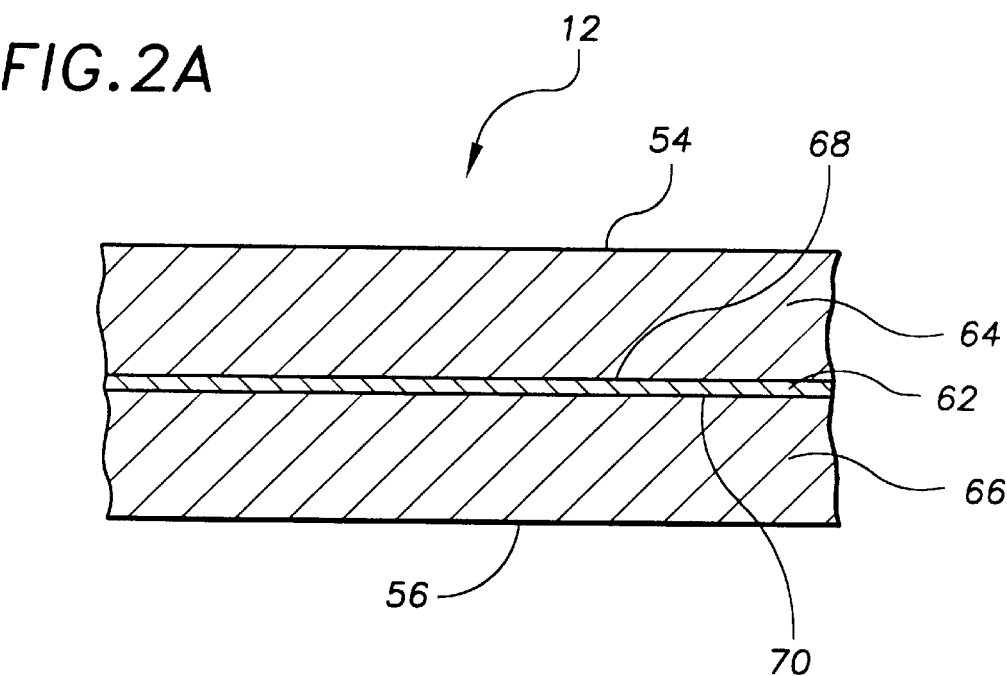
FIG. 2A is a schematic cross-section of a first embodiment of a mass transfer composite membrane of the present invention.

As best seen in FIG. 2A, the mass transfer composite membrane 12 includes a transfer medium core 62 disposed between a first rigid, porous, support sheet 64 and a second rigid, porous, support sheet 66. The inlet surface 54 of the composite membrane 12 is an exterior surface of the first rigid, porous, support sheet 64 opposed to a contact surface 68 of the first support sheet 64 that contacts the transfer medium core 62. The exhaust surface 56 of the membrane 12 is an exterior surface of the second support sheet 66 opposed to a contact surface 70 of the second support sheet 66 that contacts the core 62.

The transfer medium core 62 may be a transfer medium core means for selectively sorbing a fluid substance consisting of polar molecules within a first fluid stream containing fluid substances consisting of polar and non-polar molecules, such as a stream including water vapor and/or entrained liquid moisture (being a fluid substance consisting of polar molecules) and air (being a fluid substance consisting of non-polar molecules), and for desorbing the sorbed fluid into a second stream having a lower proportion of the fluid substance consisting of polar molecules than the first stream. In use of the transfer medium core means, the first stream would be the plant exhaust stream and the second stream would be the inlet stream. Exemplary transfer medium core means includes an ionomeric material such as a water saturated polyfluorosulfonic acid ionomer membrane sold under the brand name "NAFION" by the E.I. DuPont company of Willmington, Del., U.S.A.

The first and second rigid, porous, support sheets 64, 66 may be rigid, porous, support sheet means for supporting a transfer medium core in a rigid disposition, such as a reinforcing fiber sheet with an integral thermoset resin. Exemplary support sheets include a carbon fiber sheet with a phenolic resin, or a glass fiber sheet with an epoxy resin.

Figure 2B:
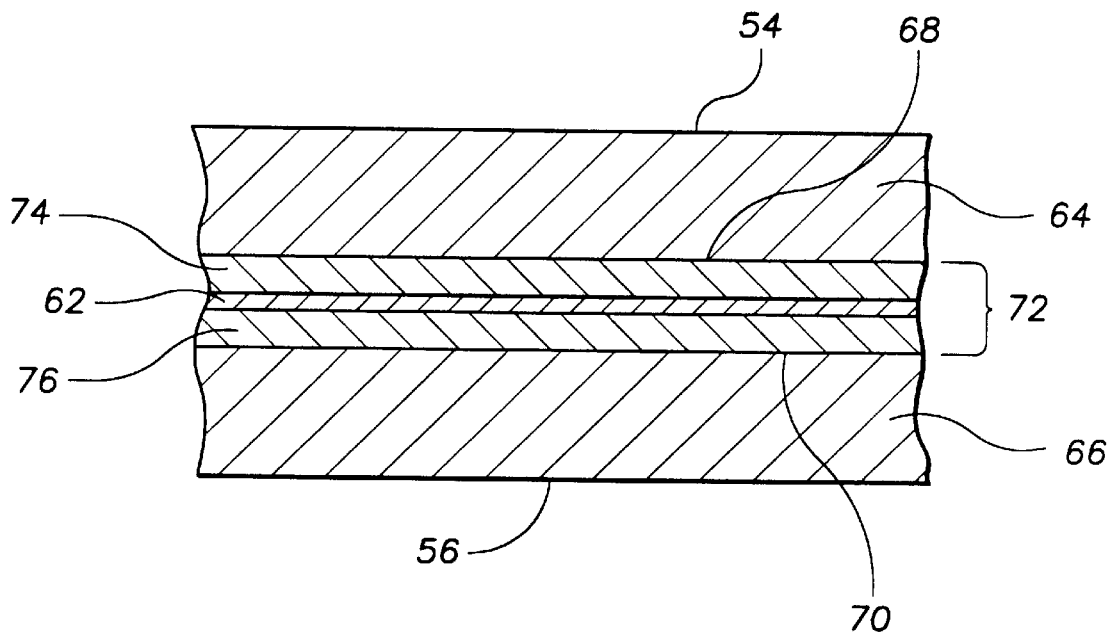
FIG. 2B is a schematic cross-section of a second embodiment of a mass transfer composite membrane of the present invention.

As shown in FIG. 2B, the mass transfer composite membrane 12 includes an alternative embodiment of the transfer medium core means, referred to herein as a triple layer core 72, wherein the core 62 is disposed between a first porous hydrophobic layer 74 and a second porous hydrophobic layer 76. Exemplary porous hydrophobic layers 72, 74 include sheets of a hydrophobic polymer such as well-known "TEFLON" polymers sold by the DuPont Company of Willmington, Del., U.S.A.

Figure 3:
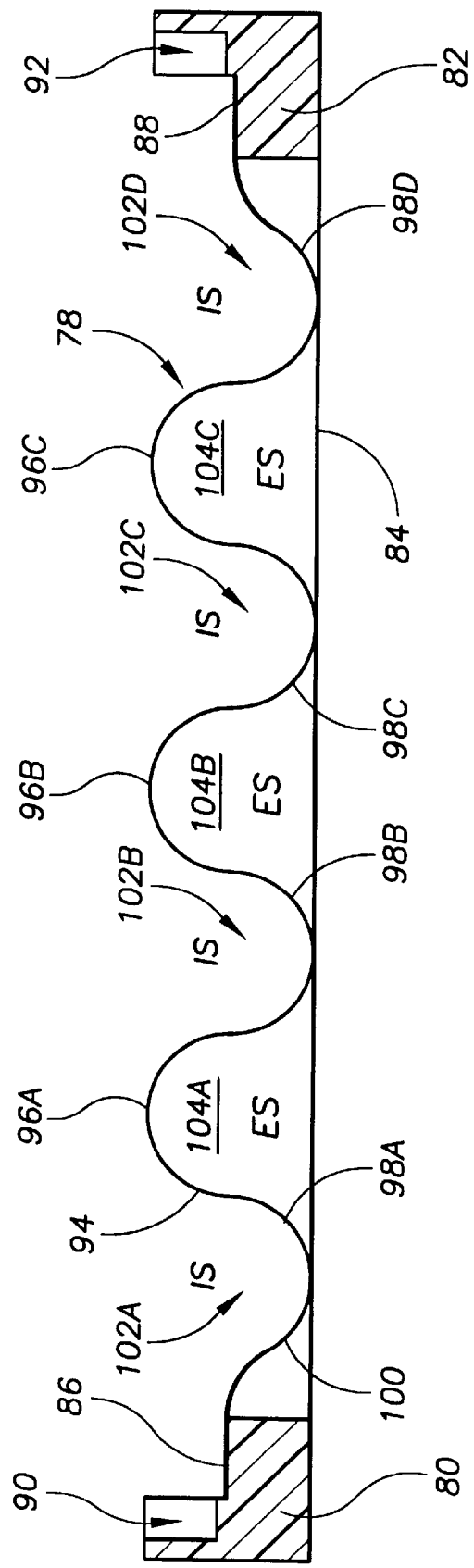
FIG. 3 is a schematic cross-section of a mounded layer embodiment of a mass transfer composite membrane of the present invention showing the membrane supported on a frame shoulder.
Figure 4:
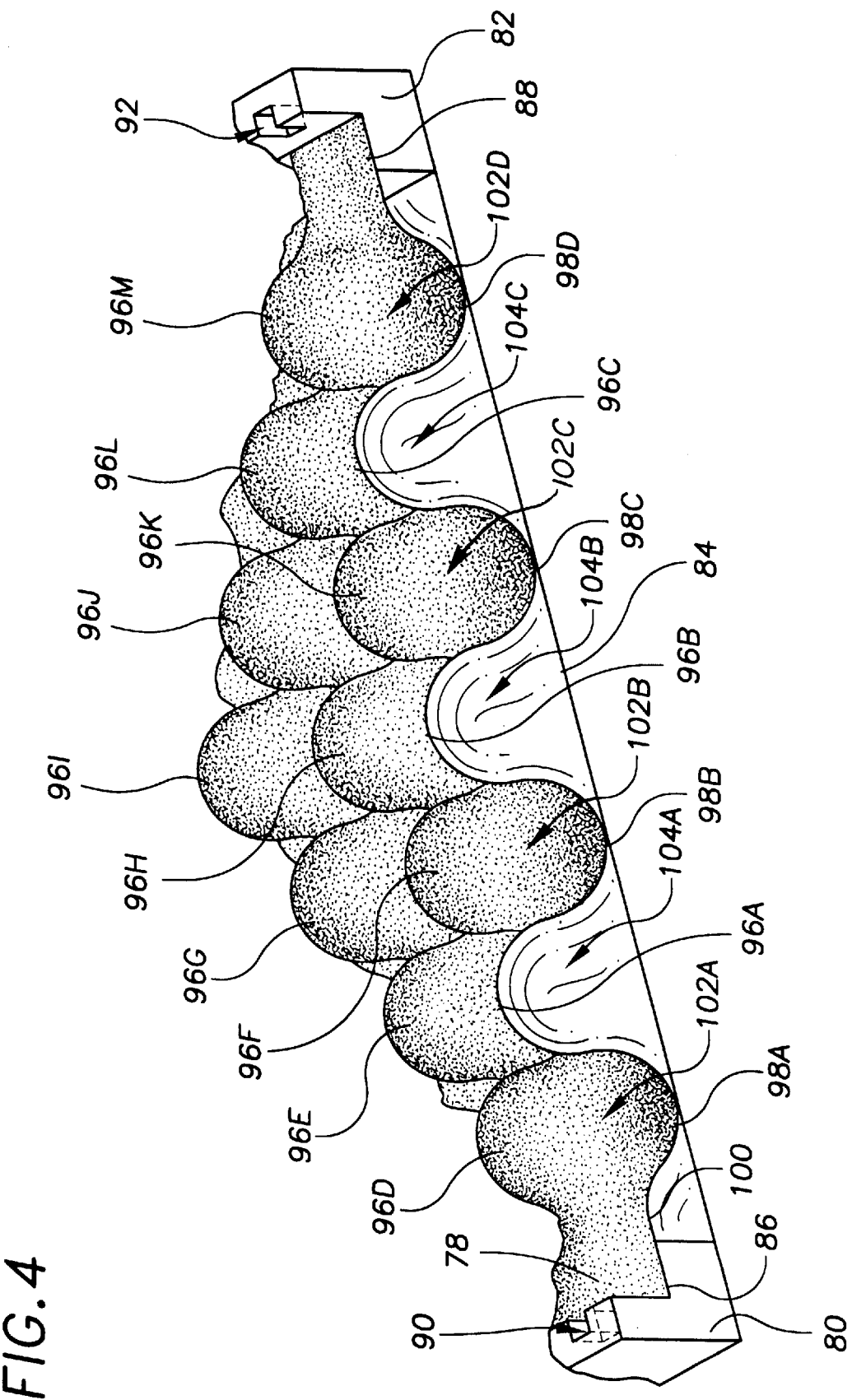
FIG. 4 is a fragmentary perspective view of the FIG. 3 mounded layer mass transfer composite membrane and frame shoulder.

The mass transfer composite membrane 12 may be formed into a mounded layer 78, as best seen in FIGS. 3 and 4 to obtain many advantages that will be described below. In a preferred embodiment, the mounded layer composite membrane 78 is secured between a first frame shoulder 80 and a second frame shoulder 82 above a bottom surface 84 of the frame 46. The first frame shoulder 80 includes a first shoulder 86 or edge, and the second frame shoulder 82 includes a second shoulder 88 so that the membrane 78 is secured to and extends between the first and second shoulders 86, 88. The first frame shoulder 80 defines a first inlet stream slot 90 and the second frame shoulder 82 defines a second inlet stream slot 92 that permit flow of the oxidant inlet stream into and out of contact with an inlet surface 94 of the mounded layer composite membrane 78.

As best seen in FIG. 3, the mounded layer composite membrane 78 forms first, second and third protrusions 96A, 96B, 96C and first, second, third and fourth depressions 98A, 98B, 98C, 98D that cooperate to define a plurality of inlet stream passages and exhaust stream passages. For ease of understanding and efficiency, inlet stream passages are designated in FIGS. 3 and 5 by the reference letters "IS", and exhaust stream passages are designated by the reference letters "ES". Exhaust stream passages ES permit the fuel cell plant exhaust stream to pass in contact with an exhaust surface 100 of the mounded layer composite membrane. Representative exemplary inlet stream passages that are seen in FIGS. 3, 4 and 5 are also provided with reference numerals 102A, 102B, 102C, 102D, and exemplary exhaust stream passages seen in FIGS. 3, 4, and 5 are likewise given reference numerals 104A, 104B and 104C for ease of understanding.

FIG. 4 is a top perspective view of a section of the FIG. 3 mounded layer mass transfer composite membrane 78 supported between first and second frame shoulders 80, 82 that shows the "egg-carton-like" shape of the protrusions and depressions of a section of the membrane 78, as opposed to just the side cross-section view of FIG. 3. Virtually identical additional protrusions of the mounded layer composite membrane 78 are shown in FIG. 4 and labelled 96D, 96E, 96F, 96G, 96H, 96I, 96J, 96K, 96L, 96M, and virtually identical depressions are partially shown adjacent those protrusions, but are not separately designated by reference numerals for purposes of clarity. In FIG. 4, the inlet stream passages 102A, 102B, 102C, 102D are more clearly shown to be integral with a network of non-linear inlet stream passages contacting the inlet surface 94 of the membrane 78, and similarly, the exhaust stream passages 104A, 104B, 104C are integral with a network of non-linear exhaust stream passages that contact the opposed exhaust surface 100 of the membrane 78. It is stressed, as FIG. 4 shows, that any additional protrusions and depressions of the mounded layer composite membrane 78 need not be in a linear or parallel row alignment, but instead may be in any arrangement to enhance mixing of the inlet and exhaust stream fluids passing within the passages defined by the membrane. Additionally, the depressions and protrusions shown in the FIGS. 3 and 4 embodiment appear to be of approximately similar dimensions, however for the present invention, the protrusions and depressions may be of any dimensions that provide for extension below and/or above a plane defined by the mounded layer composite membrane 78.

Figure 5:
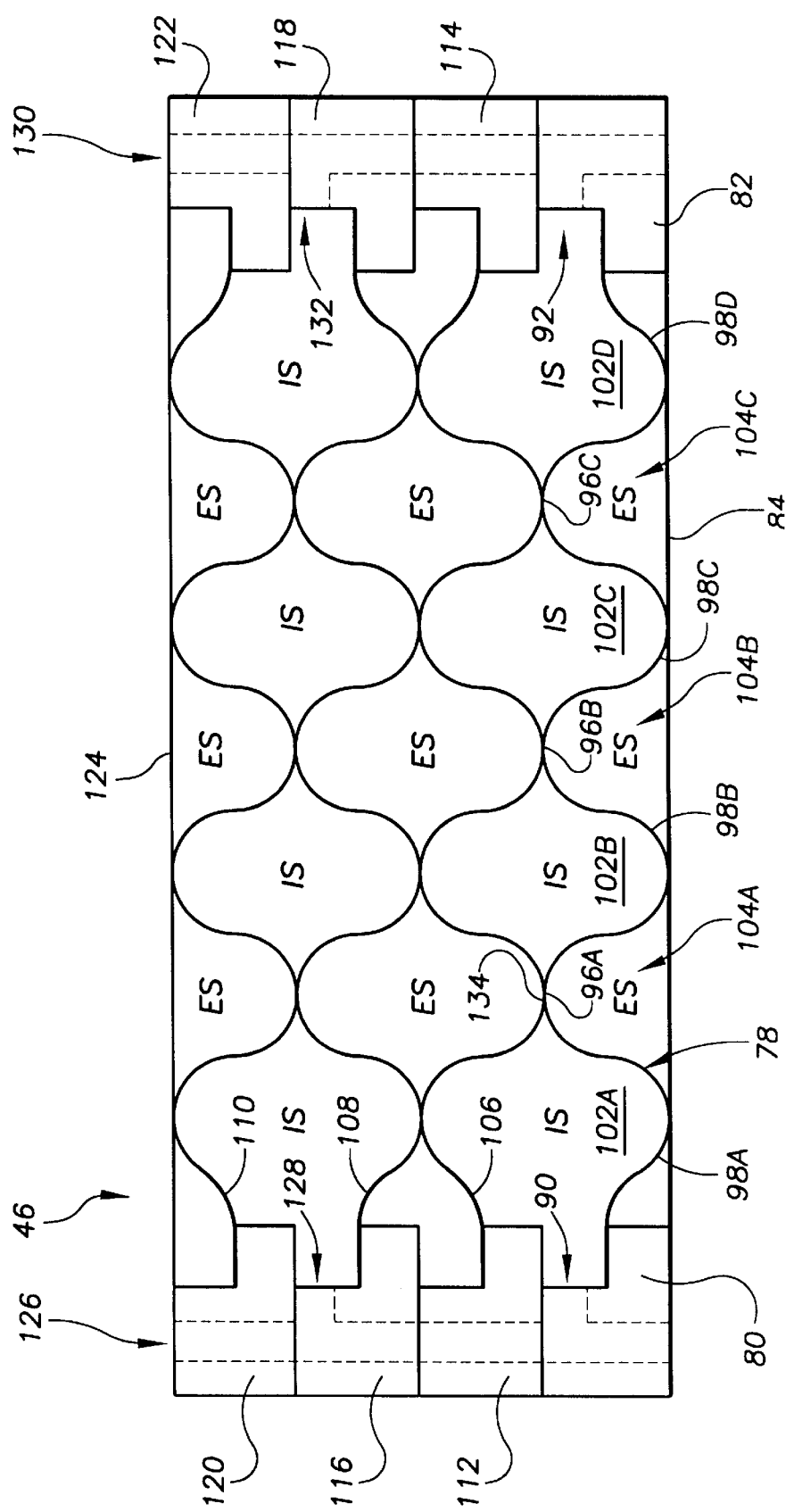
FIG. 5 is a schematic, side cross-section taken along sight line 5—5 of FIG. 6 of a plurality of mounded layer mass transfer composite membranes supported in mirror-image association within a frame.

FIG. 5 shows the mass transfer composite membrane 12 formed into a plurality of mounded layer composite membranes, including the mounded layer composite membrane 78 and first and second frame shoulders 80, 82 of FIGS. 3 and 4 stacked or disposed in mirror-image association with a second mounded layer composite membrane 106; and, a third mounded layer composite membrane 108 similarly stacked in mirror-image association with both the second membrane 106 and a fourth mounded layer composite membrane 110. The second mounded layer composite membrane 106 is supported between a third frame shoulder 112 and a fourth frame shoulder 114; the third membrane 108 is supported between a fifth frame shoulder 116 and a sixth frame shoulder 118; and the fourth membrane 110 is supported between a seventh frame shoulder 120 and an eighth frame shoulder 122, wherein the eight frame shoulders are stacked upon each other in a cooperative manner to define fluid sealing sides of the frame 46 between the bottom surface 84 of the frame 46 and a top surface 124 of the frame 46 as shown in FIG. 5.

The phrase "disposed in mirror-image association" means that at least one protrusion of a mounded layer composite membrane contacts at least one depression of an adjacent mounded layer composite membrane. For example, as shown in FIG. 5, the first protrusion 96A of the mounded layer composite membrane 78 contacts a first depression 134 of the second mounded layer composite membrane 106. As is apparent, by having a multiplicity of contacts between protrusions and depressions of adjacent mounded layers as seen in FIG. 5, the layers cooperate with each other to provide mutual structural support against movement or breach resulting from internal pressure variations between fluids in the inlet stream "IS" passages and fluids in the exhaust stream "ES" passages. Additionally contact of adjacent mounds and depressions defines a plurality of integral, serpentine passageways for the fluids to pass through, thereby enhancing both mixing of the fluids and exposure of the fluids to the surfaces of the membranes. Further, the cooperative mirror-image association of the stacked, adjacent mounded layer composite membranes 78, 106, 108, 110 within the frame 46 increases surface area exposure of the membranes to the inlet and exhaust streams per unit volume of the frame.

The first, third, fifth and seventh frame shoulders 80, 112, 116, 120 cooperatively define a first inlet stream manifold 126 that is in fluid communication with the first inlet stream slot 90, and a third inlet stream slot 128 defined in the fifth frame shoulder 116. Similarly, the second, fourth, sixth and eighth frame shoulders 82, 114, 118, 122 cooperatively define a second inlet stream manifold 130 that is in fluid communication with the second inlet stream slot 92 and a fourth inlet stream slot 132 in the sixth frame shoulder 118.

As seen best in FIG. 5, the first and second inlet stream manifolds 126, 130 therefore provide a passageway for the inlet oxidant stream to pass into and out of the inlet stream passages 102A, 102B, 102C, 102D and other inlet stream passages shown in FIG. 5 and designated by the letters "IS". It is emphasized that the first and second inlet stream manifolds 126, 130 and the associated inlet stream slots 90, 92, 128, 132 are but one embodiment of the frame 46 of the present invention and the frame may include as well manifold means for directing the inlet oxidant stream into and out of contact with the inlet 54 surface of the mass transfer composite membrane 12, and for directing the plant exhaust stream into and out of contact with the exhaust surface 56 of the membrane 12, such as the internal and external manifolding shown in U.S. Pat. No. 4,728,585 issued to Briggs on Mar. 1, 1988, and in U.S. Pat. No. 4,743,518 issued to Romanowski on May 10, 1988, both of which Patents are assigned to the assignee of the present invention, and such as manifolding well-known in heat exchanger art.

Figure 6:
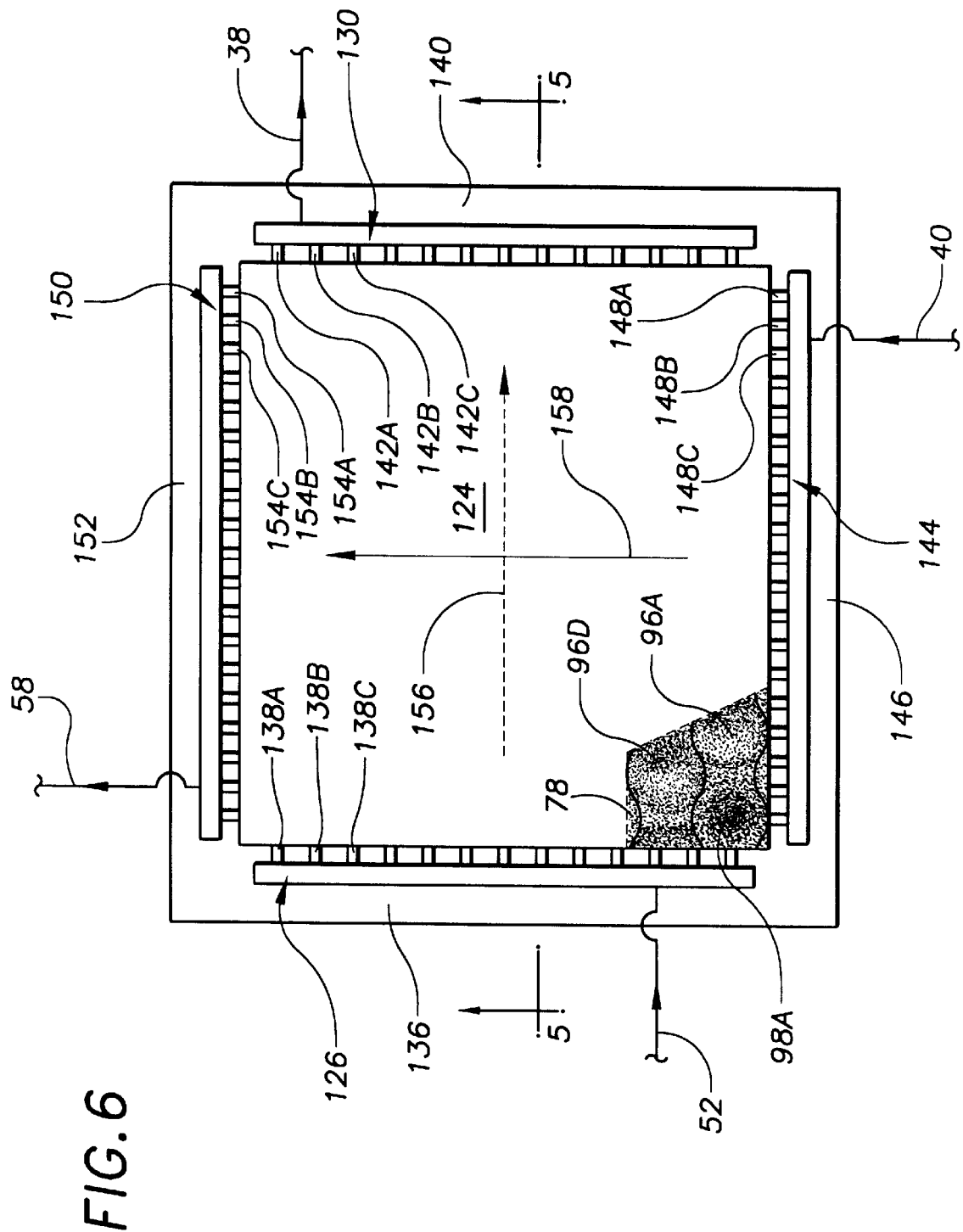
FIG. 6 is a schematic, top cross-section view of a frame for a mass transfer device housing a plurality of mounded layer mass transfer composite membranes.

FIG. 6 shows a schematic, fragmentary representation of the frame 46 from a top plan view, wherein the first inlet stream manifold 126 is shown in fluid communication with a first plurality of virtually identical inlet stream slots within an upstream inlet side 136 of the frame 46, three of which are designated 138A, 138B, 138C, and the second inlet stream manifold 130 is shown in fluid communication with a second plurality of virtually identical inlet stream slots within a downstream inlet side 140 of the frame 46, three of which are designated 142A, 142B, 142C. A first exhaust stream manifold 144 is also shown in FIG. 6 within an upstream exhaust side 146 of the frame 46 in fluid communication with a first plurality of virtually identical exhaust stream slots, three of which are designated 148A, 148B, 148C, and a second exhaust stream manifold 150 is shown within a downstream exhaust side 152 of the frame 46 in fluid communication with a second plurality of virtually identical exhaust stream slots, three of which are designated 154A, 154B, 154C.

In operation of the fuel cell power plant 10 having mounded layer mass transfer composite membranes 78, 106, 108, 110 of the present invention supported in the frame 46 shown in FIGS. 1, 5 and 6, the oxidant inlet stream would pass from the oxidant source 36 through the inlet stream feed line 52 into the first inlet stream manifold 126 and be dispersed through first and third inlet slots 90, 128, and the first plurality of inlet slots 138A, 138B, 138C into the inlet stream passages 102A, 102B, 102C, 102D and other such passages designated "IS" shown in FIG. 5. The oxidant inlet stream would then pass across the frame 46 in a general direction designated by first flow arrow 156 and out of the inlet stream passages through the second and fourth inlet slots 92, 132 and the second plurality of inlet slots 142A, 142B, 142C, into the second inlet stream manifold 130, and out of the frame 46 into the primary oxidant passage 38. The plant exhaust stream would pass through the plant exhaust passage 40 into the first exhaust stream manifold 144, through the first plurality of exhaust slots 148A, 148B, 148C, and into the exhaust passages 104A, 104B, 104C and other such passages labelled "ES" shown in FIG. 5, and continue across the frame 46 in a general direction indicated by second flow arrow 158 shown in FIG. 6. The exhaust stream would then enter the second exhaust manifold 152 through the second plurality of exhaust slots 154A, 154B, 154C, and out of the frame 46 through the plant discharge vent 58.

It is emphasized that FIG. 6 is schematic only, and that the inlet stream feed line 52, primary oxidant passage 38, plant exhaust passage 40 and plant discharge vent 58 would not enter the manifolds 126, 130, 144, 150 directly through the sides 136, 140, 146, 152 of the frame 46, but instead would be directed through conventional, efficient internal or external manifolding means as described in the above referenced two U.S. Patents and as well-known in the art. It is also pointed out that the first flow arrow 156 is in a "broken line" designation, while the second flow arrow 158 is in an "unbroken line" designation in FIG. 6 to stress that the flow direction 156 through the inlet stream passages "IS" is at a different level within the frame than the flow direction 158 through the exhaust stream passages "ES". Such different level flow is better shown in FIG. 5, wherein the flow direction 156 through the inlet passages "IS" would be from the first frame shoulder 80 to the second frame shoulder 82, while the flow direction 158 through the exhaust passages "ES" would be in a direction into FIG. 5, perpendicular to an axis between the first frame shoulder 80 and the second frame shoulder 82.

For purposes of explanation, FIG. 6 also shows a section of the top surface 124 of the frame 46 removed between the upstream inlet side 136 and upstream exhaust side 146 of the frame 46 to schematically show a section of the mounded layer composite membrane 78. As can be seen, the FIG. 6 section of membrane 78 includes the first depression 98A and the first protrusion 96A adjacent the upstream exhaust side 146 of the frame, and an additional protrusion 96D aligned behind and between the first depression and protrusion 98A, 96A, that further exemplifies the non-parallel alignment of rows of protrusions and depressions shown in FIG. 4 that serve to define the serpentine inlet and exhaust stream passages throughout the frame 46.

Predicted test operation of the mass transfer composite membrane 12 of the present invention shows beneficial results in enhancing water balance of a fifty (50) kilowatt fuel cell power plant. In the test operation, the frame 46 of the mass transfer device 14 is structured to support about 300 square feet of the composite membrane 12 disposed in mounded layers in mirror-image association as described schematically in FIGS. 3, 4, and 5. The test mass transfer composite membrane includes a transfer medium core configured as a triple layer core, wherein the core is an approximately 5–10 micron sheet of a "Nafion" —brand polyfluorosulfonic acid ionomer membrane as manufactured by the above-referenced E.I. DuPont company. The "Nafion" core is positioned between first and second porous hydrophobic layers each of which porous hydrophobic layers is about a 25 micron thick porous sheet of well-known "Teflon" brand hydrophobic polymer, as is also commonly available from the E.I. DuPont company. A triple layer core of the above described dimensions is also available assembled from the W. L. Gore company of Ekton, Md., U.S.A. and is identified as a "Gore Select Membrane". The first and second rigid, porous support sheets 64, 66 are fabricated from about an 8 micron thick carbon fiber available from the Technical Fibre Products, Ltd. company of Slate Hill, N.Y. U.S.A., under the designation "RK25", that is impregnated to about 30–50 weight percent with a phenolic resin available as grade no.

12285 from the Plenco company of Sheboygan, Wis., U.S.A. The triple layer core and first and second rigid, porous support sheets are set up on a mold (not shown) that defines a desired mounded layer configuration and then heated to 275 to 375 degrees Fahrenheit (hereafter "°F") for about five minutes. After the layer is thereby thermoset into a rigid mounded layer, it is bonded to frame shoulders, and a plurality of mounded layers and frame shoulders are secured within the water transfer device 14. The frame shoulders may be fabricated of common plastic materials well-known in the art that are compatible with bonding to the mounded layer mass transfer composite materials.

Results of the test operation show that when a plant exhaust stream (including both cathode and burned anode exhaust streams) enters the water transfer device having mass transfer composite membranes of the above described dimensions through the plant exhaust passage 40, the plant exhaust stream has a temperature of about 194° F. and a water content of about 155 pounds per hour (hereafter "P.P.H."), and as it leaves the mass transfer device through plant discharge vent 58, it has a temperature of 152° F. and a water content of about 34.4 P.P.H. The oxidant inlet stream entering the mass transfer device through inlet stream feed line 52 has a temperature of about 77° F. and a water content of about 0.0 P.P.H. As the oxidant inlet stream leaves the mass transfer device through the primary oxidant passage 38, it has increased its temperature to about 135° F. and its water content to about 120 P.P.H. It is stressed again that the described advantageous performance of the mass transfer composite membrane 12 of the present invention favorably enhances water balance of the fuel cell power plant 10 independent of ambient air temperature and humidity conditions in a light-weight, compact configuration that represents a substantial performance improvement over known fuel cell power plants.

While the present invention has been described and illustrated with respect to a particular construction of a mass transfer composite membrane for a fuel cell power plant, it is to be understood that the invention is not to be limited to those particular examples and illustrations. For example, the membrane may be utilized in a flat sheet deployment, a mounded layer embodiment disposed having no particular limit to a number of mirror-image pairs of such mounded layers, or in any other form known in the heat exchanger art to expose opposed surfaces of the membrane in a heat or mass transfer relationship with two fluids. Additionally, the primary oxidant passage 38 and plant exhaust passage 40 have been shown schematically as pipes or ducts, however they may also simply be throughbores within the structure 30 supporting the fuel cell components to which the mass transfer device is directly secured. Accordingly, reference should be made primarily to the attached claims rather than the foregoing description to determine the scope of the invention.

What is claimed is:

1. A method of recovering mass from a plant exhaust stream of fluids leaving a fuel cell of a fuel cell power plant and returning the recovered mass into an oxidant inlet stream entering the fuel cell, the method comprising the steps of:
   a. passing the exhaust stream through a first rigid, porous, support sheet of a mass transfer composite membrane that rigidly supports a transfer medium core for selectively sorbing a fluid substance consisting of polar molecules from the exhaust stream and for desorbing the fluid substance consisting of polar molecules into the oxidant inlet stream;
   b. passing the oxidant inlet stream through a second rigid, porous, support sheet opposed to the first support sheet wherein the transfer medium core is disposed between and supported by the first and second support sheets so that polar molecules sorbed from the exhaust stream are desorbed through the second support sheet into the oxidant inlet stream; and,
   c. then directing the oxidant inlet stream into the fuel cell.

2. The method of claim 1, comprising the further steps of, after passing the plant exhaust stream through the first support sheet, passing the plant exhaust stream through a first porous hydrophobic layer positioned between the first support sheet and the transfer medium core, and after passing the oxidant inlet stream through the second support sheet, passing the oxidant inlet stream through a second porous hydrophobic layer positioned between the second support sheet and the transfer medium core.

3. The method of claim 1, comprising the further steps of passing the plant exhaust stream through a plurality of serpentine exhaust stream passages adjacent the first, rigid, porous support sheet, the exhaust stream passages being defined by protrusions and depressions of a first side of a mounded layer of the mass transfer composite membrane, and passing the oxidant inlet stream through a plurality of serpentine inlet stream passages adjacent the second rigid, porous support sheet, the inlet stream passages being defined by the protrusions and depressions of a second side of the mounded layer of the mass transfer composite membrane.

4. A mass transfer composite membrane for a fuel cell power plant having an oxidant passage for directing an oxidant inlet stream into the fuel cell and having a plant exhaust passage for directing an exhaust stream out of the fuel cell, the composite membrane comprising:
   a. transfer medium core means for selectively sorbing a fluid substance consisting of polar molecules from the exhaust stream and for desorbing the fluid substance consisting of polar molecules into the oxidant inlet stream;
   b. first and second rigid, porous, support sheets positioned on opposed sides of and rigidly supporting the transfer medium core means, wherein an exterior surface of the first support sheet defines an inlet surface of the mass transfer composite membrane, and an exterior surface of the second support sheet defines an exhaust surface of the membrane; and,
   c. frame means for supporting the mass transfer composite membrane in fluid communication with the oxidant passage and with the plant exhaust passage, and for supporting the membrane in mass transfer relationship with the oxidant inlet stream and plant exhaust stream so that the inlet stream contacts the inlet surface of the membrane and the exhaust stream contacts the exhaust surface of the membrane.

5. The mass transfer composite membrane of claim 4, wherein the transfer medium core means comprises an ionomeric material.

6. The mass transfer composite membrane of claim 4, wherein the first and second rigid, porous, support sheets further comprise reinforcing fiber sheets with integral resin thermoset to rigidly support the transfer medium core means.

7. The mass transfer composite membrane of claim 4, wherein the transfer medium core means comprises a triple layer core including first and second porous hydrophobic layers positioned on opposed sides of a core means for selectively sorbing a fluid substance consisting of polar molecules from the exhaust stream and for desorbing the fluid substance consisting of polar molecules into the oxidant inlet stream.

8. The mass transfer composite membrane of claim 7, wherein the first and second porous hydrophobic layers each further comprise about a 25 microns thick porous sheet and the core means comprises about a 5 to 10 microns thick polyfluorosulfonic acid ionomeric material.

9. The mass transfer composite membrane of claim 4, wherein the membrane is formed into a mounded layer including protrusions and depressions extending away from a plane defined by the membrane inlet and exhaust surfaces wherein the protrusions and depressions cooperate to define a plurality of inlet and exhaust stream passages.

10. The mass transfer composite membrane of claim 4, wherein the frame means includes manifolding means for directing the oxidant inlet stream into and out of contact with the inlet surface of the mass transfer composite membrane, for directing the exhaust stream into and out of contact with the exhaust surface of the membrane, and for preventing mixing of the inlet and exhaust streams.

11. A mass transfer composite membrane for a fuel cell power plant having an oxidant passage for directing an oxidant inlet stream into the fuel cell and having a plant exhaust passage for directing an exhaust stream out of the fuel cell, the composite membrane comprising:

a. transfer medium core means for selectively sorbing a fluid substance consisting of polar molecules from the exhaust stream and for desorbing the fluid substance consisting of polar molecules into the oxidant inlet stream;

b. first and second rigid, porous, support sheets positioned on opposed sides of and rigidly supporting the transfer medium core means, wherein an exterior surface of the first support sheet defines an inlet surface of the mass transfer composite membrane, and an exterior surface of the second support sheet defines an exhaust surface of the membrane;

c. the mass transfer composite membrane being formed into a plurality of mounded layer composite membranes disposed in mirror-image association so that at least one protrusion of a first mounded layer contacts a depression of an adjacent second mounded layer to define inlet stream and exhaust stream passages between the layers; and, d. frame means for supporting the mounded layer composite membranes in fluid communication with the oxidant passage and the plant exhaust passage, and for supporting the membranes in mass transfer relationship with the oxidant inlet stream and plant exhaust stream so that the inlet stream contacts inlet surfaces of the membranes and the exhaust stream contacts exhaust surfaces of the membranes.

12. The mass transfer composite membrane of claim 11, wherein the transfer medium core means comprises an ionomeric membrane.

13. The mass transfer composite membrane of claim 12, wherein the first and second rigid, porous, support sheets further comprise reinforcing fiber sheets with integral resin thermoset to rigidly support the transfer medium core means.

14. The mass transfer composite membrane of claim 13, wherein the transfer medium core means comprises a triple layer core including first and second porous hydrophobic layers positioned on opposed sides of a core means for selectively sorbing a fluid substance consisting of polar molecules from the exhaust stream and for desorbing the fluid substance consisting of polar molecules into the oxidant inlet stream.

15. The mass transfer composite membrane of claim 14, wherein the first and second porous hydrophobic layers each further comprise about a 25 microns thick porous sheet and the core means comprises about a 5 to 10 microns thick polyfluorosulfonic acid ionomeric membrane.

16. The mass transfer composite membrane of claim 15, wherein the frame means includes manifolding means for directing the oxidant inlet stream into and out of contact with the inlet surface of the mass transfer composite membrane, for directing the exhaust stream into and out of contact with the exhaust surface of the membrane, and for preventing mixing of the inlet and exhaust streams.

\* \* \* \* \*